(12) United States Patent
Dinkelaker et al.

(10) Patent No.: US 11,870,597 B2
(45) Date of Patent: Jan. 9, 2024

(54) INCREMENTAL BILLING WITH BLOCKCHAINS

(71) Applicants: TELEFONAKTIEBOLAGET LM ERICSSON (PUBL), Stockholm (SE); ERICSSON TELEKOMMUNIKATION GMBH & CO KG, Frankfurt am Main (DE)

(72) Inventors: Tom Dinkelaker, Niddatal (DE); Armin Dittschar, Langen (DE); Markus Pieras, Karben (DE); Heike Scholz, Darmstadt (DE)

(73) Assignees: TELEFONAKTIEBOLAGET LM ERICSSON (PUBL), Stockholm (SE); ERICSSON TELEKOMMUNIKATION GMBH & CO KG, Frankfurt am Main (DE)

( * ) Notice: Subject to any disclaimer, the term of this patent is extended or adjusted under 35 U.S.C. 154(b) by 680 days.

(21) Appl. No.: 16/753,608

(22) PCT Filed: Oct. 6, 2017

(86) PCT No.: PCT/EP2017/075560
§ 371 (c)(1),
(2) Date: Apr. 3, 2020

(87) PCT Pub. No.: WO2019/068354
PCT Pub. Date: Apr. 11, 2019

(65) Prior Publication Data
US 2020/0244472 A1     Jul. 30, 2020

(51) Int. Cl.
*G06F 16/27*     (2019.01)
*H04L 12/14*     (2006.01)
(Continued)

(52) U.S. Cl.
CPC .............. *H04L 12/14* (2013.01); *G06F 16/27* (2019.01); *G06Q 20/389* (2013.01); *G06Q 30/04* (2013.01);
(Continued)

(58) Field of Classification Search
CPC ......... H04L 12/14; H04L 9/50; H04L 47/783; G06F 16/27; G06Q 20/389; G06Q 30/04; H04W 4/24
(Continued)

(56) References Cited

U.S. PATENT DOCUMENTS

| 2007/0011092 A1* | 1/2007 | Bishop | G06Q 20/102 |
| | | | 705/40 |
| 2016/0012465 A1* | 1/2016 | Sharp | G06Q 20/321 |
| | | | 705/14.17 |

(Continued)

FOREIGN PATENT DOCUMENTS

| CN | 101300593 A | 11/2008 |
| WO | WO 2016/128491 A1 | 8/2016 |
| WO | WO 2017/021155 A1 | 2/2017 |

OTHER PUBLICATIONS

International Search Report and Written Opinion of the International Searching Authority, PCT/EP2017/075560, dated Aug. 3, 2018, 16 pages.

(Continued)

*Primary Examiner* — Garcia Ade
(74) *Attorney, Agent, or Firm* — Sage Patent Group

(57) ABSTRACT

A method for determining a resource use of resources provided by one or more devices (50) in order to carry out a service, the method comprising at a miner (100):

determining (S41) a latest block (35b) of a blockchain (35) related to the service and a total resource information present in the latest block, wherein the total (Continued)

resource information represents the total amount of resources used by the one or more devices (50) for providing the service since a defined starting point in time, determining (S42) that a new use case of resources of a first device of the one or more devices (50) has occurred which is not reflected by the total resource information and determining a new amount of the resources used by the first device during the new use case, determining (S43) a new total resource information in which the total resource information is combined with the new amount of the resources and which reflects a complete use of the resources of the one or more devices from the defined starting point until determining the new total resource information, generating (S44) a new block of the blockchain (35), adding the new total resource information to the new block (35*c*), and adding the new block to the blockchain (35).

18 Claims, 10 Drawing Sheets

(51) Int. Cl.
*H04L 47/783* (2022.01)
*G06Q 30/04* (2012.01)
*H04W 4/24* (2018.01)
*G06Q 20/38* (2012.01)
*H04L 9/00* (2022.01)

(52) U.S. Cl.
CPC .............. *H04L 9/50* (2022.05); *H04L 47/783* (2013.01); *H04W 4/24* (2013.01)

(58) Field of Classification Search
USPC .......................................................... 705/52
See application file for complete search history.

(56) References Cited

U.S. PATENT DOCUMENTS

2017/0103167 A1* 4/2017 Shah .................... G06Q 10/101
2017/0243222 A1* 8/2017 Balasubramanian ........................ G06Q 20/4014

OTHER PUBLICATIONS

Satoshi Nakamoto, "Bitcoin: A Peer-to-Peer Electronic Cash System", pp. 1-9.

Irina S. Zimakova, "BlockCharge: the blockchain-based solution for charging electric cars", https://www.linkedin.com/pulse/blockcharge-blockchain-based-solution-charging-cars, Published on Oct. 27, 2016,4 Pages.

Office Action dated Jul. 25, 2022 for Chinese Patent Application No. 201780095650.0, 14 pages (includes English Translation).

* cited by examiner

US 11,870,597 B2

INCREMENTAL BILLING WITH BLOCKCHAINS

This application is a 35 U.S.C. § 371 national stage application of PCT International Application No. PCT/EP2017/075560 filed on Oct. 6, 2017, the disclosure and content of which is incorporated by reference herein in its entirety.

TECHNICAL FIELD

The application relates to a method carried out at a miner for determining a resource use of resources provided by one or more devices in order to carry out a service, and relates to the corresponding miner. Furthermore, a method for operating a billing node is provided together with the corresponding billing node.

Additionally, a system comprising the miner and the billing node is provided, a computer program comprising program code and a carrier comprising the computer program.

BACKGROUND

A blockchain is a continuously growing list of records in which each block contains a link to a previous block. One aspect of blockchains is that the data contained in the blockchain cannot be modified so that blockchains can serve as an open distributed ledger that can record transactions of parties. A blockchain is managed by a peer-to-peer network wherein each node of the network has access to the blockchain via the peer-to-peer network and each node of the network stores a local copy of the blockchain updated through the network. The network furthermore makes sure that each node in the network has an up-to-date copy of the blockchain and a byzantine conflict resolution protocol makes sure that the global copies cannot drift away from each other.

One application of blockchain is the currency Bitcoin. Current blockchain applications like Bitcoins have the problem that the data in the blockchain constantly grows and have reached the size of 100 GB at 2016. The large size of the blockchain limits the possible use scenario of blockchains.

Accordingly, a need exists to avoid the above mentioned drawback and to provide new use cases for blockchains, such as an effective determination of a use of resources provided by a device within a defined time period.

SUMMARY

This need is met by the features of the independent claims. Further aspects are described in the dependent claims.

According to a first aspect, a method for determining a resource use of resources provided by one or more devices is provided in order to carry out a service. The method is carried out at a miner in a network which determines a latest block of a blockchain related to the service and which determines a total resource information present in the latest block wherein the total resource information represents the total amount of resources used by the one or more devices for providing the service since a defined staring point in time. Furthermore, the miner determines that a new use case of resources of a first device of the one or more devices has occurred which is not reflected by the total resource information, wherein a new amount of resources is determined used by the first device during the new use case. Furthermore, a new total resource information is determined in which the total resource information is combined with the new amount of the resources and which reflects a complete use of the resources of the one or more devices from the defined starting point until determining the new total resource information. Furthermore, a new block of the blockchain is generated and the new total resource information is added to the new block and the new block is added to the blockchain.

With the method it is possible to always effectively determine the total amount of the used resources used by the one or more devices in order to carry out a service. A device may be a vehicle, a lawnmower, a mobile phone, etc. Each device provides a certain service to a user, e.g. the user may use the vehicle, the lawnmower or the cell phone and should pay for the use of the resources provided by the device. As the new block added to the blockchain always comprises and reflects the total use of the resources since a defined starting point, it is possible to easily determine the total resource use since the beginning of the defined starting point in time by accessing the new block added to the blockchain. When the complete resource use is known, the costs for this resource use can be determined easily. The defined starting point in time can define a starting point of a billing period in which the billing for the use of resource is started.

Multiple devices may be used to provide a service (e.g. a car or a bike for offering transportation services). In case when multiple devices are used a new block generated for the usage of a specific device in the blockchain may comprise identification information of this specific device, which would then allow to identify the resource usage of that specific device from the blockchain.

Furthermore, it may be determined that the billing period should be closed and the new total resource information present in a last block of the blockchain is determined and the blockchain may be closed and a billing node responsible for the billing of the use of the resource may be informed of the new total resource information present in the last block. In this example, a blockchain can be even closed when a billing period is closed so that a blockchain can be generated for each billing period which comprises information reflecting the total use of the resources within the billing period.

Furthermore, a miner is provided comprising a memory and at least one processing unit wherein the processing unit comprises instructions executable by the at least processing unit wherein the miner is operative to operate as discussed above or as discussed in more detail below.

As an alternative, a miner is provided comprising a first module configured to determine a latest block of the blockchain related to a service and a total resource information present in the latest block, wherein the total resource information represents the total amount of resources used by the one or more devices for providing the service since the defined starting point in time. The miner can comprise a second module configured to determine that a new use case of resources of a first device of the one or more devices has occurred which is not reflected by the total resource information and configured to determine a new amount of resources used by the first device during the new use case. The miner can comprise a third module configured to determine a new total resource information in which the total resource information is combined with the new amount of the resources and which reflects a complete use of the resources for the one or more devices from the defined starting point in time until determining the new total resource information. The miner can comprise a fourth module configured to generate a new block of the blockchain which adds the new total resource information to the new block and which adds the new block to the blockchain.

Furthermore, a method for operating a billing node is provided configured to monitor a use of resources provided by one or more devices in order to carry out a service. Here, a contract for the use of the resources is determined wherein the contract provides at least billing information allowing the billing node to determine costs arising for the use of the resources. Furthermore, identification data of a blockchain is determined, wherein the blockchain comprises the total resource information which reflects a complete use of the resources used by the one or more device for providing the service since a defined starting point in time in a billing period. Furthermore, it is determined that the billing period is over and a miner is informed that the billing period is over. The billing node furthermore receives the total resource information from the miner and determines the total costs for the use of the service based on the received total resource information.

With this method, a billing node responsible for the billing for the use of the resources can control the billing period and its length and can inform a miner which generates the blockchain accordingly. The billing node then receives the total resource information from the miner and can determine the costs occurring for the use of the resources in the billing period which starts at the defined starting point in time and which ends at a defined point in time. The total costs may be determined based on the received total resource information alone so that the received total resource information already comprises the involved costs. As an alternative, the billing information provided in the contract may be used in addition to the known total resource use in order to determine how much a user has to pay for using the service provided by the one or more device.

Furthermore, the corresponding billing node comprising a memory and at least one processing unit is provided wherein the processing unit comprises instructions executable by the at least one processing unit wherein the billing node is operative to operate as mentioned above or discussed below when the instructions are executed by the at least one processing unit.

Alternatively, a billing node is provided comprising a first module configured to determine the contract for the use of the resources provided by the one or more devices in order to carry out a service wherein the contract comprises at least the billing information allowing the billing node to determine the costs arising for the use of the resources. The billing node may comprise a second module configured to determine identification data of the blockchain, wherein the block chain comprises a total resource information which reflects a complete use of the resources used by the one or more device for providing the service since the defined starting point in time, i.e. in the billing period. A third module can determine that the billing period is over and can inform a miner that the billing period is over. A fourth module can receive the total resource information from the miner and a fifth module is configured to determine the total costs for the use of the one or more device based on the received total resource information.

Furthermore a system comprising the miner and the billing node is provided. Additionally a computer program comprising program code to be executed by at least one processing unit of a miner or of a billing node is provided, wherein execution of the program code causes the at least one processor to execute a method as discussed above or as discussed in more detail below. In addition a carrier comprising the computer program is provided, wherein the carrier is one of an electronic signal, optical signal, radio signal, or computer readable storage medium.

It is to be understood that the features mentioned above and features yet to be explained below can be used not only in the respective combinations indicated in the specification, but also in other combinations or in isolation without departing from the scope of the present application. Features of the above mentioned aspects and embodiments described below may be combined with each other in other embodiments unless explicitly mentioned otherwise.

BRIEF DESCRIPTION OF THE DRAWINGS

The foregoing and additional features and effects of the application will become apparent from the following detailed description when read in conjunction with the accompanying drawings in which like reference numerals refer to like elements.

DETAILED DESCRIPTION

Figure 1:
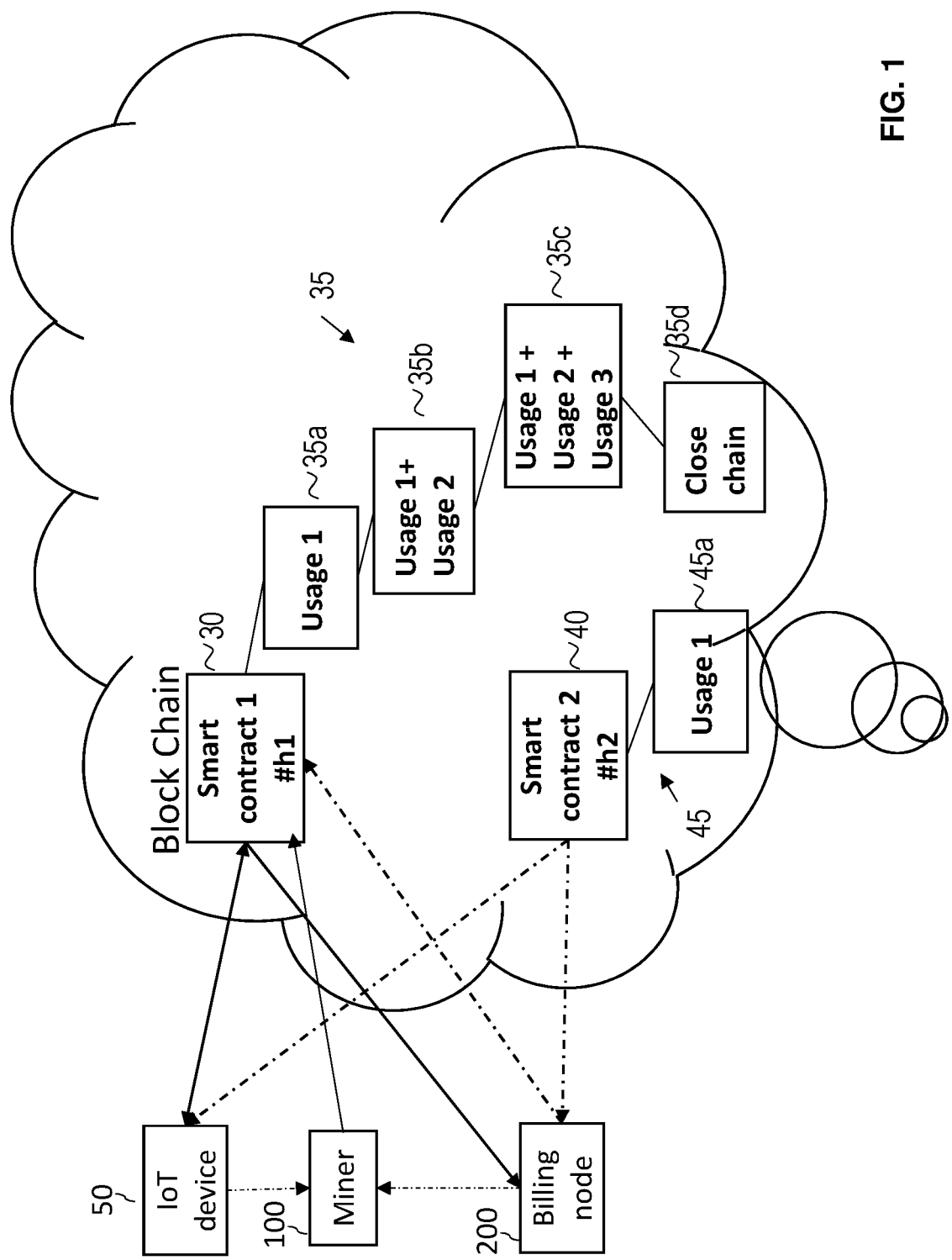
FIG. 1 shows an example of a high level architecture of a network including the involved nodes such as a miner generating a blockchain for billing purposes and a billing node which determines when a billing period should be closed.

In the following embodiments will be described in detail with reference to the accompanying drawings. It is to be understood that the following description of embodiments is not to be taken in a limiting sense. The scope is not intended to be limited by the embodiments described hereinafter or by the drawings, which are to be illustrative only.

The drawings are to be regarded as being schematic representations, and elements illustrated in the drawings are not necessarily shown to scale. Rather, the various elements are represented such that their function and general purpose becomes apparent to a person skilled in the art. Any connection or coupling between functional blocks, devices, components of physical or functional units shown in the drawings and described hereinafter may also be implemented by an indirect connection or coupling. A coupling between components may be established over a wired or wireless connection. Wireless blocks may be implemented in hardware, software, firmware, or a combination thereof.

As discussed below, the present application provides a technique in which a detailed usage information for the usage of resources provided by one or more devices in order to carry out a service is present, at least for the current or running billing period, and may be present for a limited time afterwards so that the involved parties, the user and the party billing for the use of the device, can discuss obligations resulting from the use. In some jurisdictions, it is even required to delete communication data after a certain time, such as for example six months. The solution below provides a possibility to close a blockchain after a billing period is completed. For billing purposes the last entry in the blockchain at the end of the chain should contain the sum of the usage inside the billing or billing period. The application is especially applicable to a postpaid environment with the use of a blockchain. The billing charges are aggregated in the blockchains, by way of example in real time, and at the end of the billing period the user of the one or more devices providing the required service is billed. Accordingly, the blockchain technology is adapted and optimized for postpaid billing use cases by aggregating the usage charges and by offering a new transaction after the end of the billing period is reached. A closure transaction may close the existing blockchain and can open a new blockchain for the next billing period. The data of the previous blockchains may be kept and archived, compressed or deleted. The scenario described above or below mainly relates to a post-paid environment. However, the block chain can be also used for a pre-paid scenario, where a certain pre-paid amount of resource usage is credited into the first block and then the "available" resources coded in a block are reduced in a newly generated block each time when a device is used, until no credit is left.

For Bitcoins, it is not possible to reduce the size of the blockchain, as they rely on the public general ledger in which all transactions of the past must be known by each node or client to verify the correctness of a Bitcoin.

However, there are billing scenarios where not all the data is needed for all times. By way of example, in billing scenarios the use of a device or the use of resources of a device or the use of services provided by a device has to be known in a defined billing period. To this end the use of resources provided by a device in order to carry out a service, has to be determined precisely within a defined period of time.

As will be explained below, a user may have to pay for the use of the resources provided by a device which is connected to a network in which at least one miner and at least one billing node is provided. An example for a device providing a service is a lawnmower, a 3D printer, a set-top box, a vehicle, a mobile communications entity, or the like. The device can be an IoT (Internet of Things) device wherein the device may provide its service only in case it can store the needed usage information for billing.

The solution discussed above and below increments the usage and allows to close a blockchain after a billing period is over and allows the opening of new blockchains in a new billing period. As for example shown in FIG. 1, a device 50 such as an Internet of Thing device is provided in a peer-to-peer network in which each node of the network such as the device 50, a miner 100 or a billing node 200 has access to a blockchain such as blockchains 35 and 45 discussed in more detail below. Each of the nodes in a network may have a copy of the blockchain 35 or 45. The device 50 may have a copy of the whole blockchain or just a part of it, like for example just the last block of the blockchain. For each blockchain a contract such as a smart contract is stored in a starting block of the blockchain, in the embodiment FIG. 1 for example in starting block 30 of blockchain 35, or in the starting block 40 including the contract for another blockchain 45 of another billing period. The contract is used to define the usage agreements between the user, the device 50, and the billing provider which is responsible for the billing node 200. The usage of smart contracts for setting up the agreement also means that the advantages of the smart contract concept can be used, namely the self-governed execution of the contract in real time and the low execution and compliance costs.

Accordingly, in a first step a contract has been agreed and is exchanged between the involved parties and stored in a starting block 30 as shown by the solid arrows between device 50, the billing node 200 and the block where the smart contract, block 30, is shown.

The contract can establish the usage of the device 50 (or the usage of a plurality of devices) and is stored in the blockchain 35 or 45 so that it can be accessed by the contracting parties. The blockchain concepts of private and public keys and cryptographic hash functions may be used to control the access to the smart contract. The contracting parties may be controlled using blockchain security concepts when accessing the smart contract. When the device 50 is switched on a usage of the resources provided by the device is requested and the usage transactions are executed as new transactions in the blockchain. The first usage may be already stored in the blockchain or the requested usage may be stored in the blockchain, such as block 35a. The usage is summed up and entered as a new block in the blockchain. For the first usage the miner can add block 35a. Thus, as shown in FIG. 1 when the device such as a 3D printer or the lawnmower is used for the first time before the service is actually used, this first usage is stored in the first usage block 35a which indicates the total amount of resources used in the first use case. When further use cases occur, further block entries can be added to the blockchain, see 35b and 35c.

Furthermore, it is possible that the amount of requested usage is stored in the added blockchain. Thus the device 50 knows the amount of resources it has to provide for the requested use case. The device does not allow a higher usage of the resources than the requested resources. After the requested usage, when the requested usage has not been fully used, the usage may be corrected, i.e. by adding a negative amount of resources which has not been used to a new block to the blockchain. Applied to FIG. 1 this means that a new block can be added, called correction block, e.g. between block 35c and 35d. This correction block then subtracts the used amount from the already used amount (e.g. Usage 1+Usage 2+Usage 3+(−correction)). Thus, one option is to only add a single block with the requested amount of resources before the usage, another option is to add a block with the requested usage of the resources for a new use case and after the usage of the new use case is terminated, it is determined whether the requested usage has to be corrected. The corrected amount is then added as a new block (correction block) after the block with the requested usage. The difference of the actual usage compared to the requested usage is then subtracted from the last block in order to have a usage in the last block of the blockchain that reflects the actual usage.

A use case may be defined by a resource use during a certain time period such as one day, by the fact that the device is turned off again or by any other criteria depending on time or location. Resource information can be stored in the blockchain before the actual usage happens.

When a user wants to use the device 50 (or any other device from the plurality of the devices) after the first usage, the information is transmitted to a miner 100 and when the miner 100 detects the new use case, it determines the amount of resources used in the new use case. The miner then determines a new total resource information in which the total resource information stored in block 35*a* generated by the miner is added to the usage of resources occurring in a second use case, so that block 35*b* contains the combined total use or the new total resource information. The same is again carried out for a third use case and at the end of the third use case block 35*c* then contains the complete usage history of the device in the present billing period. When the billing period starts the blockchain 35 is opened and all use cases are collected in the current or present blockchain. The billing node has knowledge about the billing interval, by way of example a billing should be carried out each time at the end of a month, at the end of the week or at the end of any other defined period in time and the billing node informs the miner that the billing period should be closed. The billing node can have access rights such that only a billing node can trigger a closing of the blockchain. If the billing period ends or has ended, the miner closes the blockchain by adding a closing block 35D. The miner furthermore determines the latest total resource information present in the latest block, here block 35*c* and informs the billing node 200 of the total resource information representing the total usage of the resources within the billing period. The usage information can be stored in time units. A rule for summing up the usage of the resources could be stored at the contract and be applied by the device. A possible rule for summing up could be to sum up the usage on different counters, depending on the time of day, the weekday, or whatever. Then billing could use the set of counters to apply different prices.

The information in the blockchain can also contain a data or time volume used by the device or a date volume transmitted to the device as usage information or can directly include price information which directly reflects the amount of money which has to be paid for the usage of the resources within the billing period.

When a new billing period is opened or started a new smart contract is stored in a new starting block 40 of the second blockchain 45 with a new identification or address (#h2 in the example of FIG. 1), and when a first use case occurs in the new billing period this use case and the corresponding resource information is stored in the first block 45*a* of the second blockchain.

At the end of a billing period the billing provider or node 200 navigates through the contracts of the user or customer and triggers a closing transaction. This transaction returns the usage charge of the last block that is billed to the user or customer of the one or more device and which closes the blockchain and may open a new blockchain for a possible next billing period.

In currently used blockchains a last transaction is only added to the blockchain. This existing use of the blockchain is enhanced by first reading the last entry of the blockchain and then perform an operation on the read last entry and new information related to the new use case in order to sum up the total usage. The last entry in the blockchain should always contain the total usage since the starting of the billing period.

A further aspect is that the billing node 200 can perform a closing transaction that reads the last entry of the blockchain 35 to generate the bill, and which closes the blockchain by adding a closure block such as block 35*d* and which may open a new blockchain such as the blockchain 45 for the next billing period. The old blockchain may be compressed and/or archived, wherein the compression may mean that all usage data are removed and only the contract, the last block with the sum of the usage and the closure information is left.

The usage may be provided by a single device 50 or by a group of devices 50 each providing the same service or each belonging to the same (smart) contract. The device could even provide different services and the rules at the contract could specify that the resources of different services may be summed up on the same or different counters. The usage of the resources provided by any of the devices of the group can be collected and charged in the billing period.

The usage of the device 50 is established via the smart contract which contains the contract details and the identification/address of the blockchain. The contract is known by the device 50 and by the billing node 200. The device 50 provides the service if it can find a valid contract for a user in the blockchain. When the device is activated it can send usage transactions via the miner 100 as shown by the dashed line from the miner to block 30. The execution of the usage transaction adds the sum of the last and the new entry as a new entry in the blockchain. In this incremental billing scenario the operation is to sum up the usage of the resources, and the usage present in the former block and the new entry (reflecting the new total resource usage) is added as a new block at the end of the blockchain. Accordingly, the last entry is read, the usage charges or resource usage information is summed up in the block of the new transaction. Accordingly, a real time and incremental billing of resource usage is possible.

When the end of the billing period is reached the billing node 200 forms a closing transaction as represented by the dashed dotted lines shown in FIG. 1 in which the first blockchain is informed of the closure and a new blockchain is generated wherein the one or more device 50 is informed of the new blockchain for the new billing period. A new contract is stored in the new blockchain for the upcoming billing period and the address of the new blockchain is transmitted over the network to all nodes involved. The billing node can then finally generate an invoice evaluating the last entries in the blockchains (for example at the end of the billing period).

Figure 2:
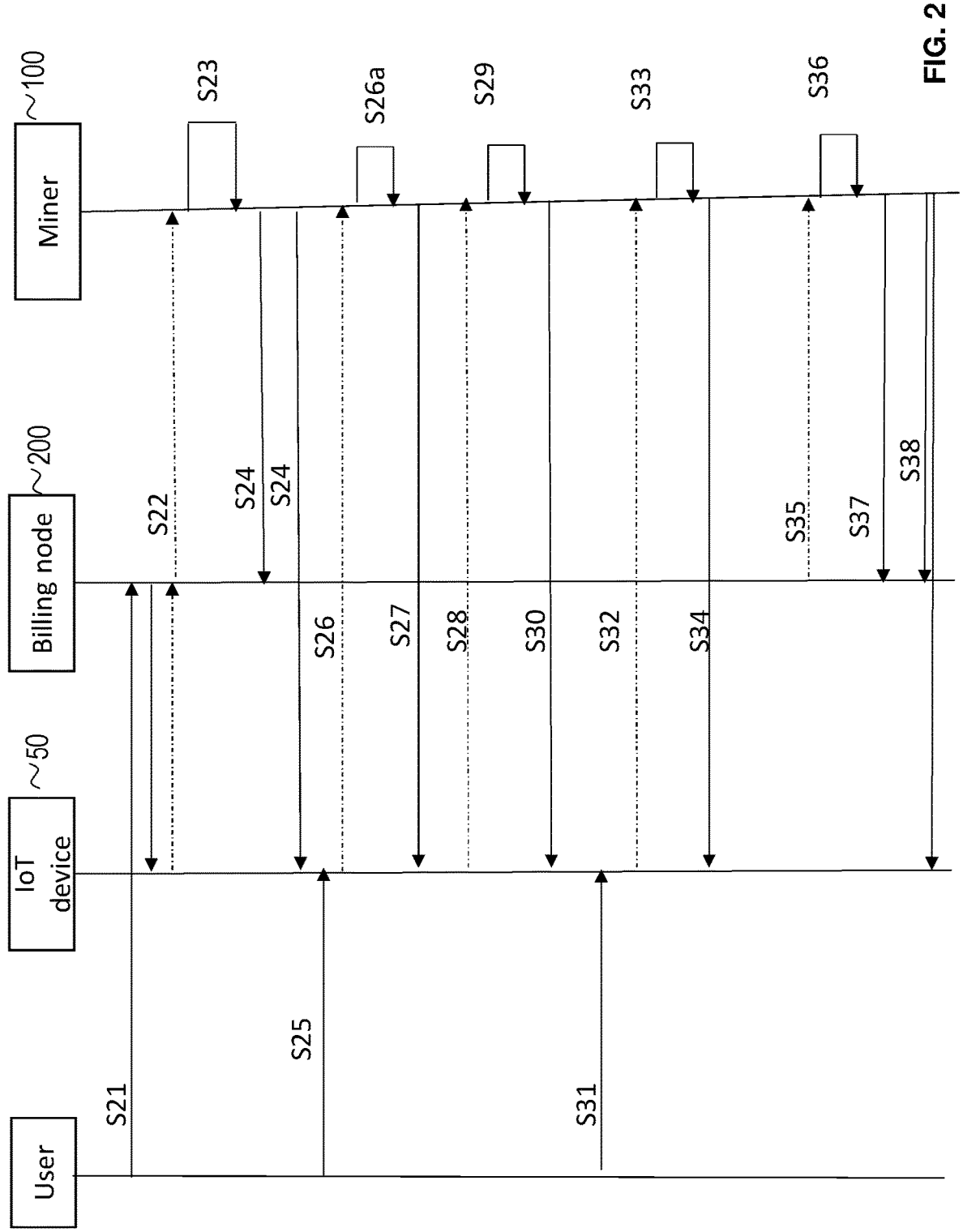
FIG. 2 shows an example message exchange between some of the entities shown in FIG. 1 when a total resource use of resources provided by one or more device is reflected in a blockchain and in which a billing node determines the costs associated with the use of the resources within a billing period.

FIG. 2 summarizes some of the steps carried out in one possible implementation and shows the interaction between different entities. In step S21 a user agrees (for example signs) a contract with a service provider (for example via a billing node) about the use of the resources provided by one or more devices, and the one or more device 50 is informed about the agreement of the contract. In step S22 the miner 100 is informed to create a smart contract which is done in step S23. In step S24 the contract key with the identification/address information (#h1) representing the identification data of the blockchain is spread over the network so that each part in the peer-to-peer network is aware of the contract. The device is known in the request and the billing node is known in the contract. In step S25 the user may switch on a device for using it and therefore a usage request is transmitted to the miner in step S26 as usage transaction for this contract. The miner then generates a new block for the blockchain, here the first block, in step s26a and adds the usage transaction to the blockchain. In step S27 the device may be informed about the added block which is added to the blockchain for the new usage and by this, the device gets the usage block from its local copy of the blockchain. The received block informs the device 50 about the requested usage and the device may be configured such that it does not allow a usage of the resources higher or greater than the requested amount.

When a further resource use is not necessary, the use case may be over and the blockchain with the added block reflects this use case and the resources of the device used during this use case (or for all previous use cases in the ongoing billing period if this was not the first use case). The method may then continue with step S35 discussed in further detail below.

However a situation can occur that the requested usage requested in step S26 was not enough or that not all the requested resources were used in the first usage. In step S28 the device informs the miner of a new usage transaction and the miner sums up the last and the new usage in step S29 by adding a new block to the blockchain for the new use case, wherein the information of the total resource use with the newly added block may be transmitted to the device in step S30.

As a further option it is possible that it is checked whether the actual usage of the resources was smaller than the requested usage. For example in step S31 the device is switched off and in step S32 this information is transmitted from the device to the miner 100 If for example the rules of the contract are such that after the end of the usage the remaining resources shall be subtracted from the block chain again, then the miner is informed about the remaining or used amount of resources in step S32. In step S33 the miner will then add the remaining resources, as correction block, as a negative amount to the block chain, acting as a correction of a requested but not used up amount. This correction is then transmitted to the device 50 in step S34.

In step S35 the billing node may determine that the billing period is over and can inform the miner accordingly. In step S36 the miner closes the blockchain, may create a new contract and may transmit the usage record with information about the complete use of the resources within the billing period to the billing node in step S37. In step S38 the miner may inform the billing node and the device of the new contract and of the new blockchain with new identification/address information of the new blockchain.

Figure 3:
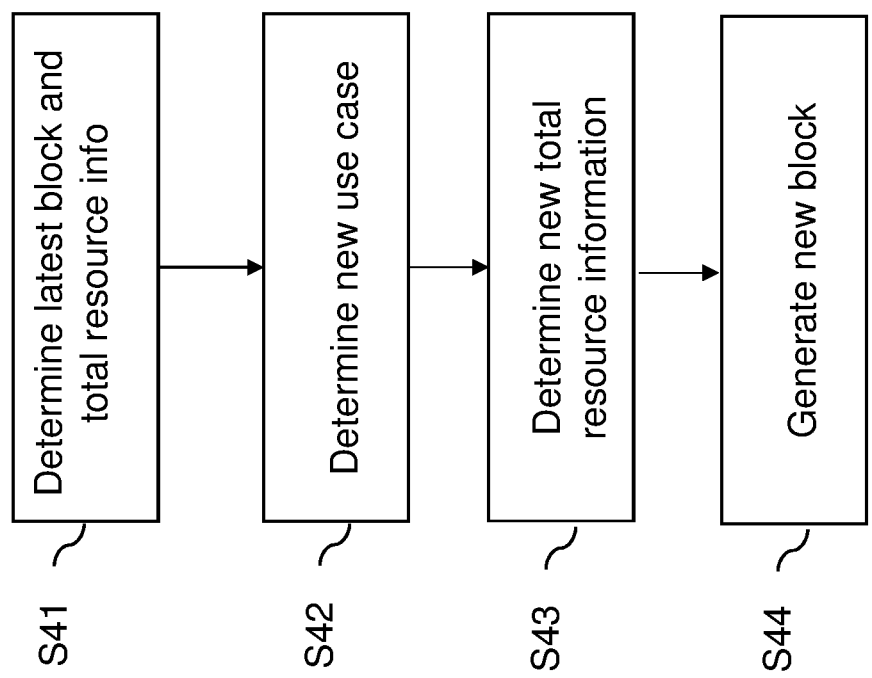
FIG. 3 shows an example flow chart of a method carried out be a miner in order to determine a total resource information reflecting a complete use of the resources in a billing period.

FIG. 3 summarizes the steps carried out at a miner in the above discussed scenario. In a step S41 the miner determines a latest block in the blockchain. By way of example it is supposed that block 35b is present in the blockchain after two use cases. In step S42 the miner determines that a new use case occurs which is not yet reflected by the resource information present in block 35b. The miner furthermore determines the new amount of resources used by a device during this new use case and in step S43 a new total resource information is determined in which the total resource information, e.g. present in block 35b is combined with information about the new amount of resources used by the new use case so that in step S43 a new total resource information is determined reflecting the complete usage of the resources in the present billing period. In step S44 a new block, such as block 35c is generated for the blockchain and added to the blockchain wherein this new block contains the new total resource information.

As indicated above, the miner may additionally determine in steps not shown that the billing period should be closed when receiving the corresponding information from the billing node. Then the miner can close the blockchain by adding a closing block such as block 35D thereby informing the billing node of the latest total resource information provided in the latest block.

Figure 4:
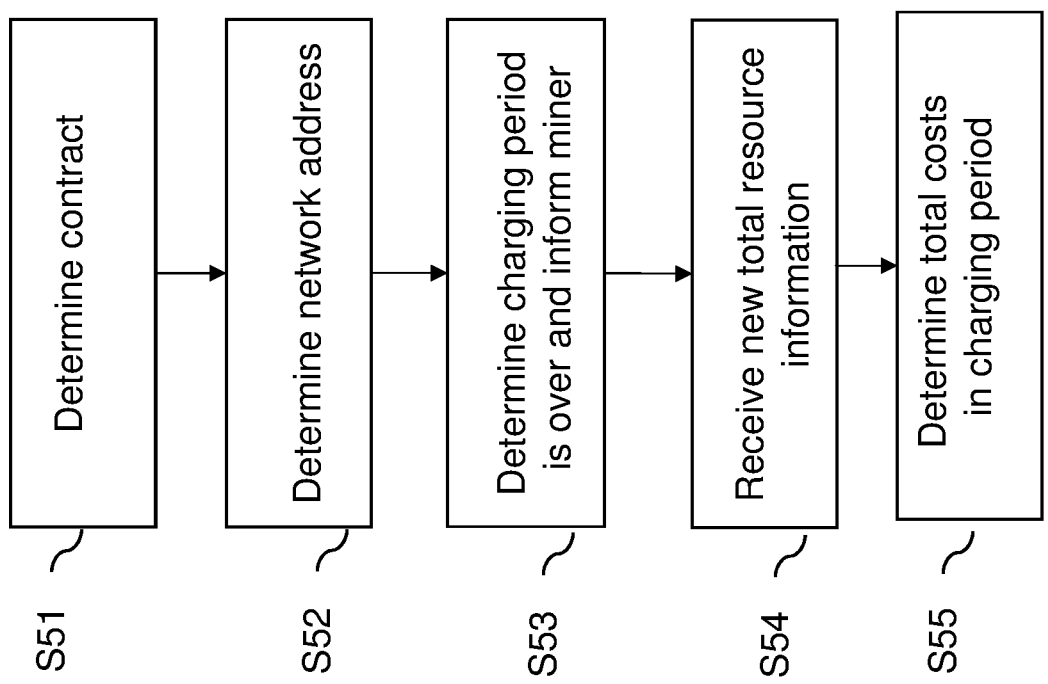
FIG. 4 shows an example flow chart of a method carried out by a billing node for determining the costs arising in a billing period for the use of the resources provided by one or more devices.

FIG. 4 summarizes some of the steps carried out at the billing node 200.

In a step S51 the billing node can determine a contract which contains at least the billing information allowing the billing node to determine the costs arising for the use of the resources. In step S52 the billing node determines identification data of the blockchain such as the address information, wherein the blockchain comprises the total resource information reflecting the complete use of the resources from a defined starting point. In step S53 the billing node determines that the billing period is over and informs the miner 100 accordingly. Then the miner then closes the blockchain and transmits the information to the billing node so that in step S54, the billing node receives the new total resource information reflecting the total use of the resources within the billing period. In steps S55 the billing node can then determine the costs for the use of the one or more device based on the received total resource information and based on the information provided by the contract.

Figure 8:
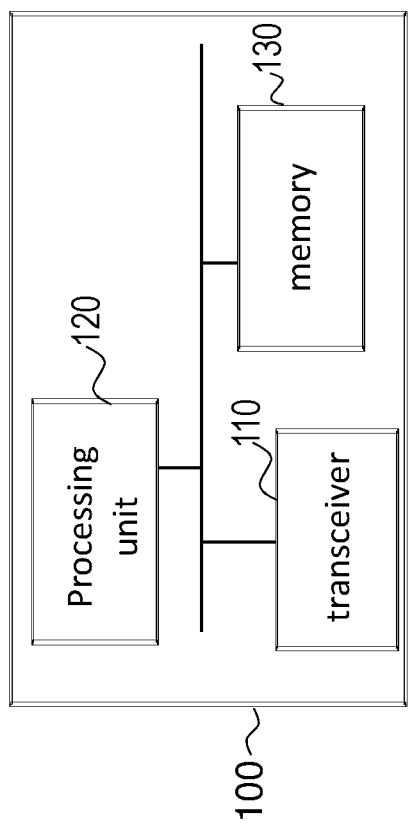
FIG. 8 shows another exemplary schematic representation of a miner configured to generate blockchains which reflect a total resource use within a billing period.

FIG. 8 shows a schematic architectural view of a miner 100 which can carry out the steps discussed above in which the miner is involved. The miner 100 comprises a transceiver 110 which is provided for transmitting user data or control messages to other entities such as the device 50 or the billing node 200 and which is configured to receive user data or control messages from other entities. The miner can furthermore comprise a processing unit 120 which is responsible for the operation of the miner 100. The processing unit 120 comprises one or more processors and can carry out instruction stored in a memory 130. The memory may include a read-only memory, a random access memory, a mass storage, a hard disc or the like. The memory can furthermore include suitable program code to be executed by the processing unit 120 so as to implement the above described functionalities of the miner.

Figure 9:
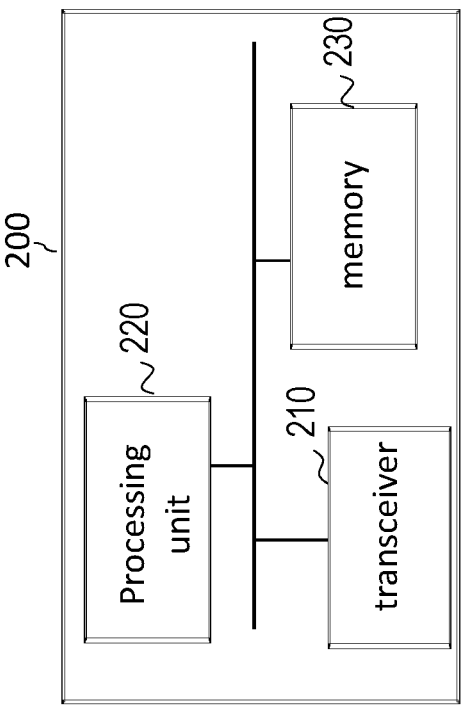
FIG. 9 shows another exemplary schematic representation of a billing node configured to determine the costs for the use of the resources provided by one or more devices within a billing period.

FIG. 9 shows a schematic architectural view of a billing node 200 which is involved in the above scenario. The billing node 200 comprises a transceiver 210 provided for transmitting user data or control messages to other entities or nodes and provided for receiving user data or control messages from other entities such as the miner 110 or the device 50. The billing node 200 furthermore comprises a processing unit 220 which is responsible for the operation of the billing node 200. The processing unit 220 comprises one or more processors which can carry out instructions stored on a memory 230, wherein the memory may include read-only memory, a random access memory, a mass storage, a hard disc or the like. The memory 230 can furthermore include suitable program code executed by the processing unit 220 so as to implement the above described functionalities in which the billing node 200 is involved.

Figure 5:
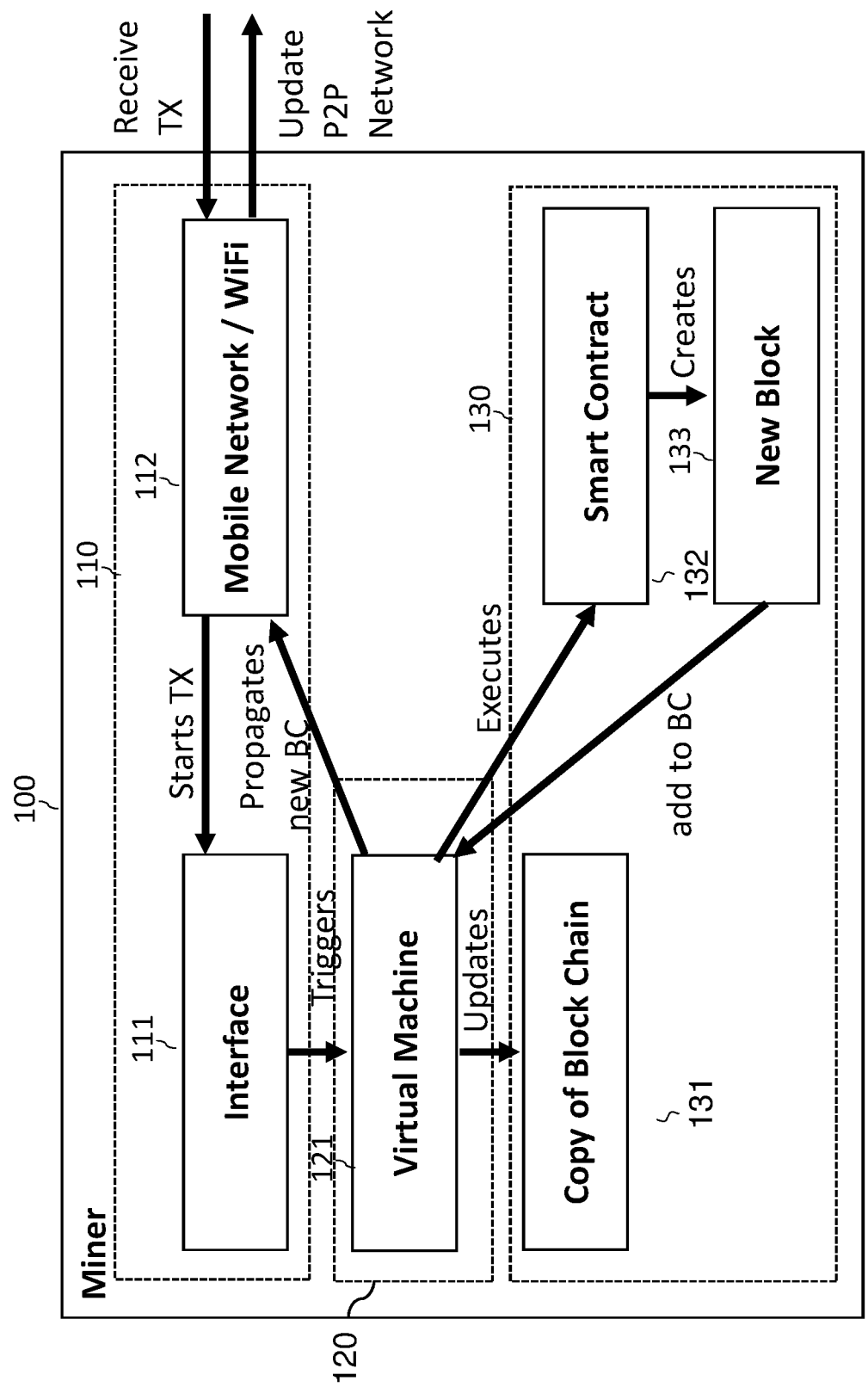
FIG. 5 shows an exemplary schematic representation of a miner configured to generate a blockchain used to determine the costs for the use of the resources.

FIG. 5 shows a more detailed view of a miner 100 with the transceiver 110, the processing unit 120 and the memory 130. The transceiver can comprise an interface 111 which interacts with a virtual machine 121 of processing unit 120 and can comprise a mobile network or WiFi interface 112 which is used for the transmission or reception of information from the network. By way example, when the miner receives information about a new use case from the network, interface 112 may inform interface 111 which then triggers the virtual machine 121 used as processing unit to operate as discussed above. By way of example, the smart contract 132 is executed and a new block 133 for a new use case is generated and added to the blockchain. The processing unit 120 then also updates the copy of the blockchain stored 131 in the memory 130. The miner also updates the other entities in the network about the newly added block through interface 112.

Figure 6:
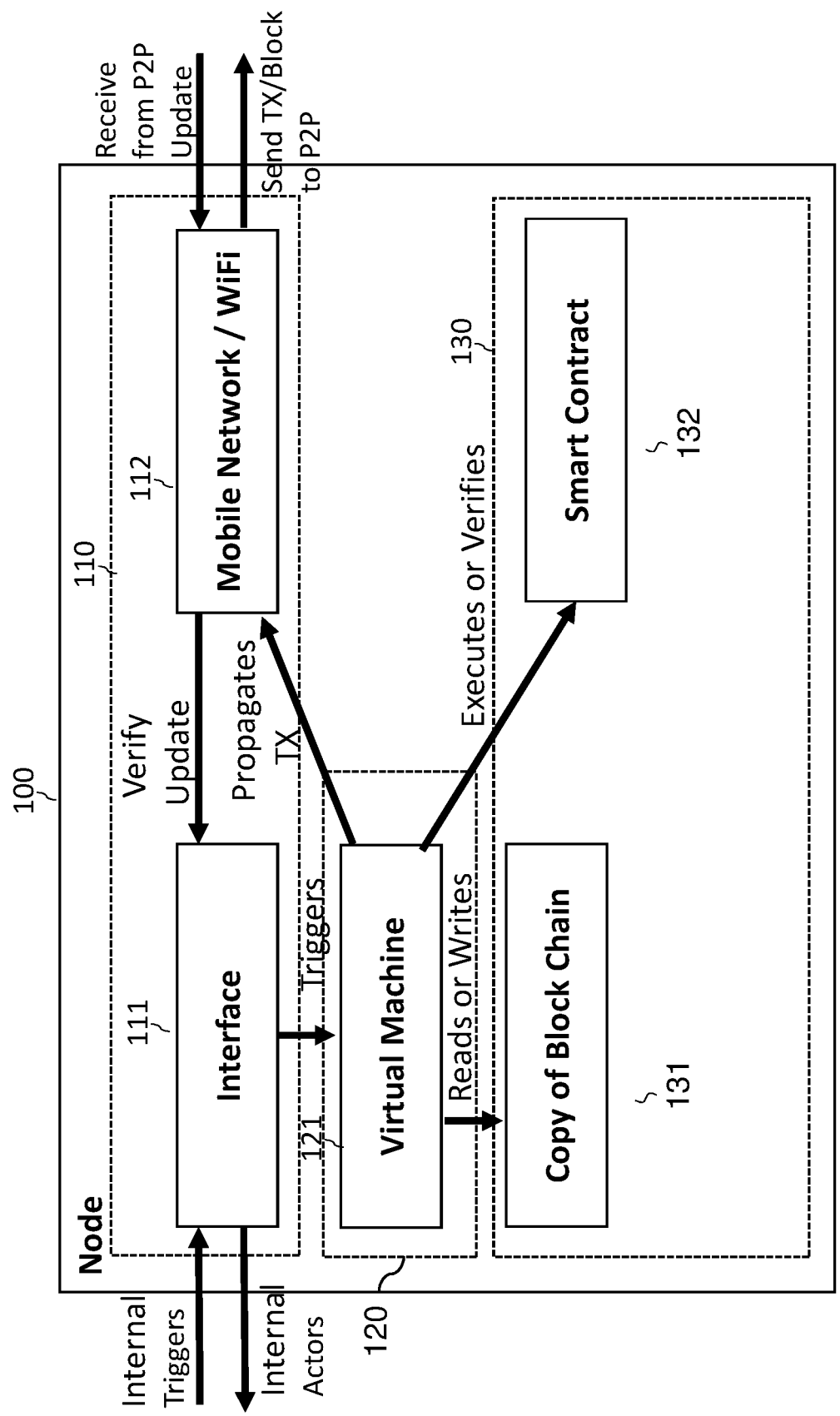
FIG. 6 shows another exemplary schematic representation of another node present in the network of FIG. 1.

FIG. 6 shows an architectural view of one of the nodes present in the peer-to-peer network involved in the scenario discussed above wherein the node may be a miner, a billing node, or any other node. In the example shown, the node receives an update about a blockchain from other nodes such as another miner via interface 112 and the interface towards the virtual machines transmits this update to the processing unit 120, where also the smart contract is executed and verified. The updated blockchain may be stored in the copy of the blockchain 131. An internal trigger can be used which could be an abstract event inside the node. For the IoT device this could be an event such as pushing a button or switching on to request the device. For the billing node this could be a timer event for the end of the billing period.

Figure 7:
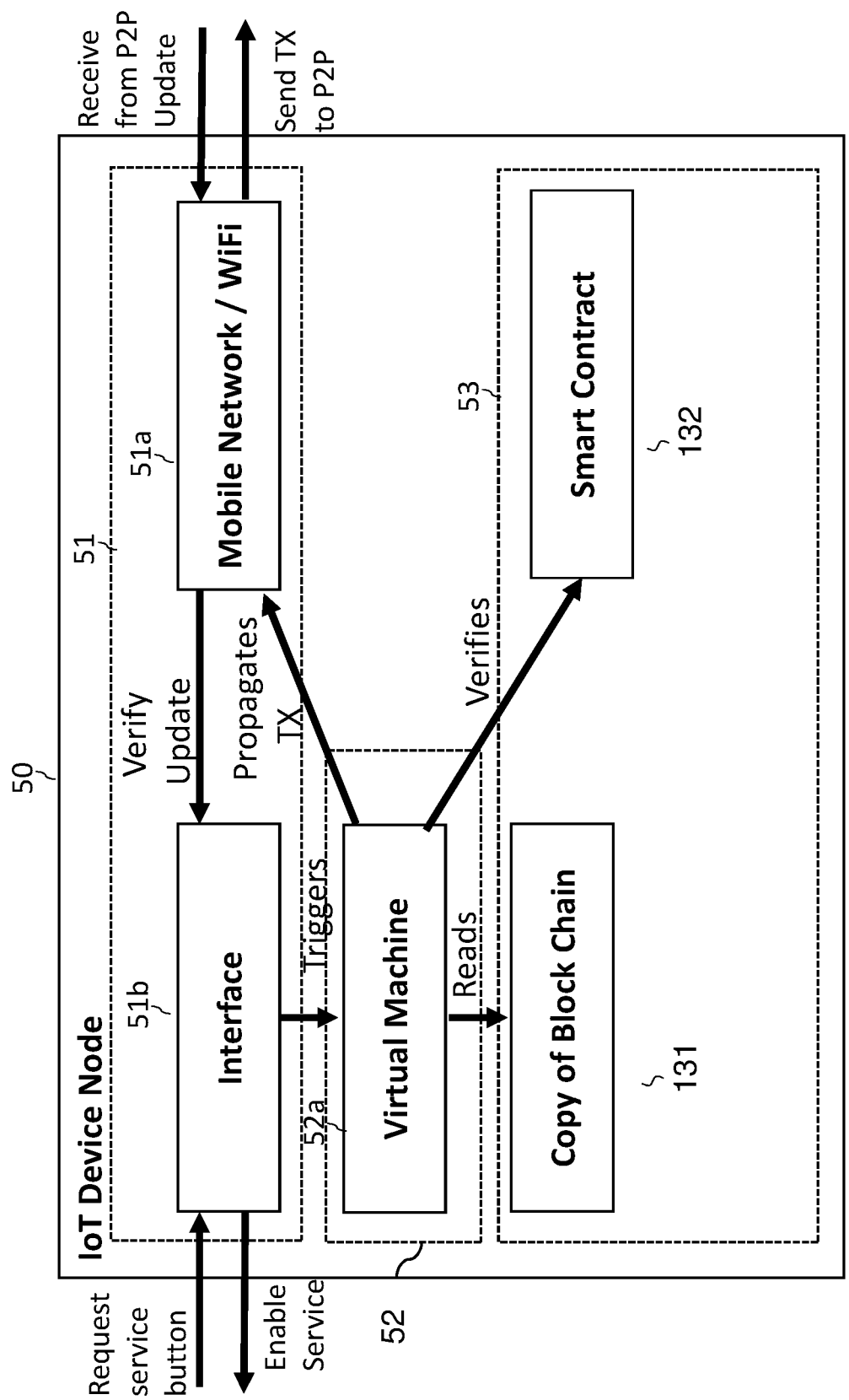
FIG. 7 shows an exemplary schematic representation of a device configured to provide a service within a billing period.

In FIG. 7 amore detailed view of the device 50 is shown comprising an interface 51, a processing unit 52 and a memory 53. The device 50 may receive by interface 51b an update from the network as shown on the left side which then triggers virtual machine 52a to read the copy of the blockchain 131 which is also stored in the device 50. Furthermore, the device can additionally contain the smart contract 132 and can propagate the transaction to the mobile network or WiFi network via interface 51a and can send the transaction to the network and the miner node and may finalize and enable the service requested by the user when the update is received from the miner.

Figure 10:
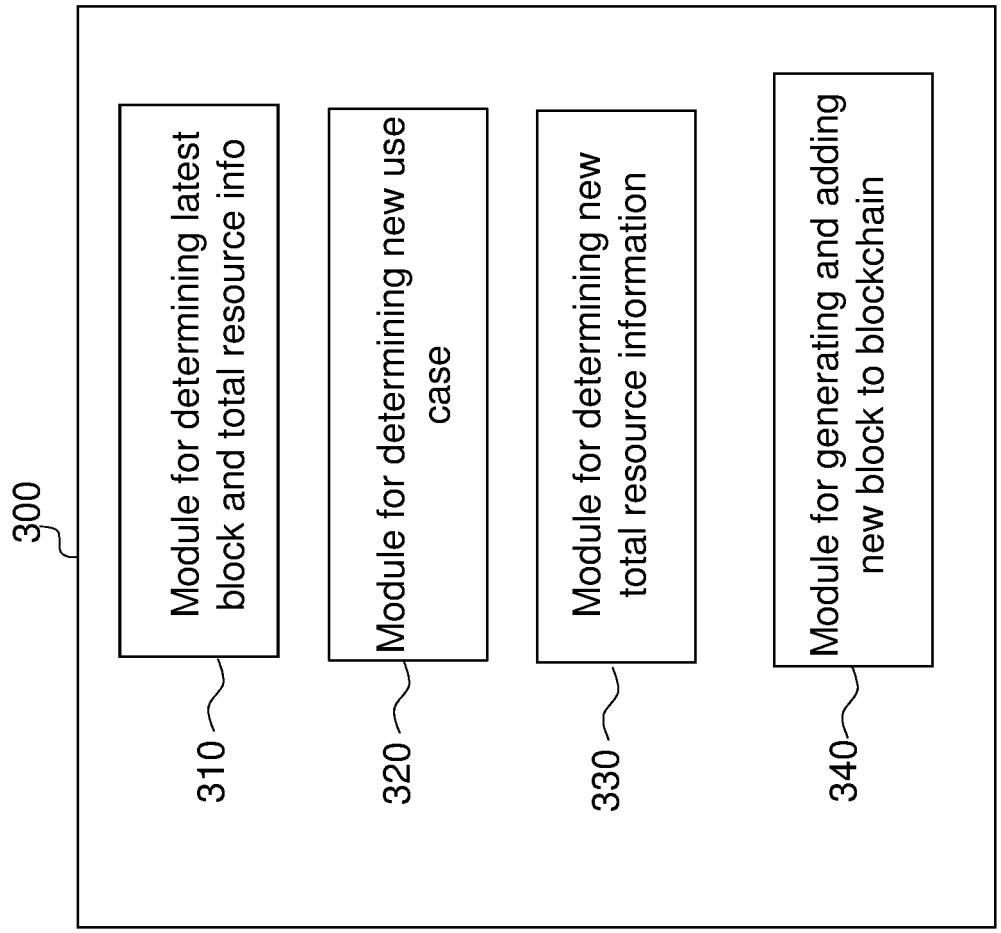
FIG. 10 shows another schematic representation of a miner node configured to generate a blockchain including information about a total resource use of resources provided by one or more devices within a billing period.

FIG. 10 shows another schematic view of a miner wherein the miner 300 comprises a first module 310 for determining the latest block and the latest resource information which is present in the blockchain before a new use case occurs. Module 320 is then provided for determining that a new use case for the resources has occurred and which is not yet reflected in the total resource information determined by module 310. A module 330 determines the new total resource information reflecting a complete use of the resources within the billing period until now, i.e. when the new total resource information is determined, a module 340 is provided which generates a new block and adds the new block to the blockchain including the new total resource information.

Figure 11:
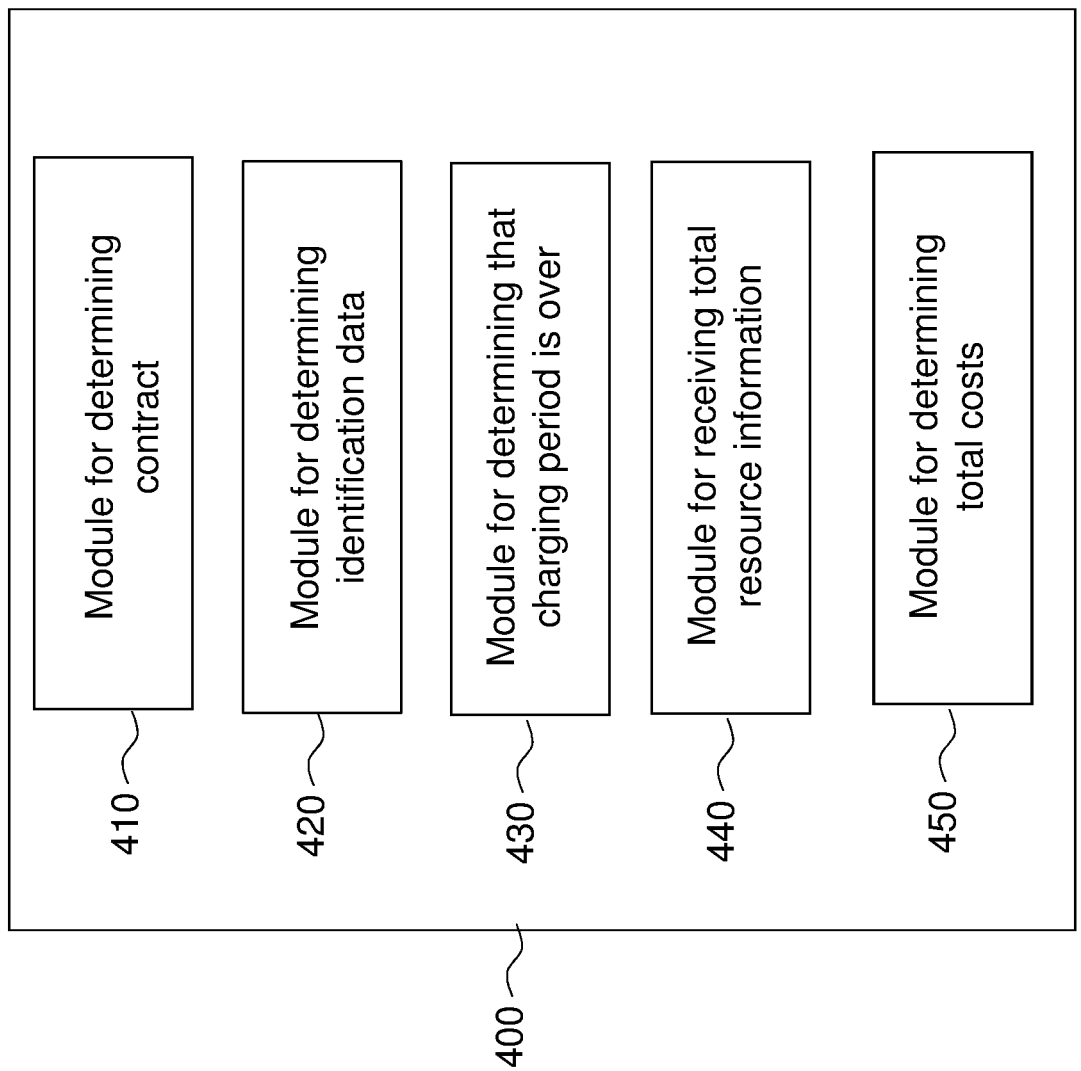
FIG. 11 shows another schematic representation of a billing node configured to determine the costs arising in connection with the use of the resources within a billing period.

FIG. 11 shows another schematic view of a billing node 400 which monitors the use of the resources of the device 50. The billing node comprises a first module 410 for determining a contract with the charge information for the use of the resources. The billing node 400 comprises a module 420 for determining identification data and the identification data can comprise the network address which can be a hash value of the blockchain as shown in the figures. Furthermore, a module 430 is provided which determines that the current billing period is over and which informs a miner that the billing period is over. A module 440 is provided for receiving the total resource information present in the last block of the blockchain and a module 450 is provided for determining the total costs arising for the use of the resources in the billing period.

The sequence diagram of FIG. 2 shows in a simplified form that the user signs a contract for the usage of a service which can be provided by one or more device 50. The smart contract may be created via a miner and the blockchain returns the hash address of the contract (#h1) to the contracting parties which then transmit this information to the one or more device 50. When the user switches on the device, the device sends the usage record to the miner which stores it in the blockchain and activates the service for example for a certain time. Further usage transactions are sent wherein the usage is aggregated and the sum of the usage is stored as a new block at the end of the blockchain. These steps are repeated as long as the device is used and with the switch-off of the device the last usage transaction is sent. During those steps the blockchain may be closed, and a new blockchain may be generated (for example when the billing period expires).

At the end of each billing period, such as a month, the billing node 200 closes the period and navigates through the known active contracts. The last block of a given blockchain for a contract is returned and this is the entry which is relevant for the billing purpose. With the closure transaction the blockchain is closed and a new contract may be created and provisioned for the next billing period wherein the contracting parties may be informed of the key or identification/address of the new contract.

From the above said some general conclusions can be drawn.

As far as the miner is concerned, the miner 100 can determine that the billing period should be closed wherein this information may be received from the billing node 200. The miner can then determine the new total resource information present in a last block of the blockchain and can close the blockchain, e.g. by adding a closing block. Furthermore, the miner can inform the billing node of the new total resource information present in the last block.

Furthermore, the miner can start a new blockchain when the blockchain is closed and can add new identification data such as new address information to the new blockchain.

Furthermore, the blockchain can comprise a contract containing at least the identification data of the blockchain and the usage information indicating which user is entitled to use the resources of the device. The service may be provided by a single device or one or more devices providing the same service. By way of example, a fleet of devices may be provided such as a fleet of vehicles or a fleet of lawnmowers and each time one of the devices is used the use of the resources is added up in the blockchain, when the use of different devices providing the same service can be summed up in the same blockchain.

When a new use case of the resources is detected by the miner, it can be checked based on the usage information whether the new use case is allowed. It is possible that the use of the resource is not allowed for the new use case when the new use case is not in agreement with the usage information of the contract.

The contract can furthermore comprise billing information which is used to determine the costs arising for the use of the resources. The new total resource information which indicates the total costs is then determined based on the billing information, wherein the total costs arise for the use of the resources since the defined starting point in time.

The contract with the billing information may be stored in a starting block 30 or 40 of the blockchain as shown in FIG.

1. Furthermore, it is possible that the last block of the blockchain is transmitted to the billing node with the new total resource information.

Furthermore, it is possible that a control program needed for execution of the service of the device may be provided in the blockchain by the miner wherein the miner may receive a request originating from the device to use the resources of the device wherein the miner may then transmit the control program to one of the devices requesting the use of the resources.

When it is determined that the billing period should be closed, it is possible to archive the blockchain, and/or to compress the blockchain, and/or to delete the blockchain. Furthermore, all the information about the use of the resources may be removed from the blockchain while at least the new total resource information may be kept.

The miner can furthermore determine a requested amount of resources that is requested for the new use case. The requested amount of resources is then stored in the new block to be added to the blockchain for this new use case.

Furthermore it is possible that after the new use case is terminated (the resources have been used) the actual new amount of resources used in the new use case is determined. If the actual new amount of resources differs from the requested amount of resources, the difference between the actual new amount of resources and the requested amount of resources is determined and this difference can be stored in a correction block which is then added to the blockchain.

As far as the billing node is concerned, the billing node may determine the total costs for the use of the device based on the received total resource information and based on the billing information present in the contract.

The billing node may furthermore receive identification data of a new blockchain which should collect the total resource information representing the total amount of resources used by the one or more devices for providing the service in a new billing period. The billing node may furthermore determine that also the new billing period is over and can inform the miner that the new billing period is over. The billing node can then receive the new total resource information for the new billing period and can determine the total costs for the use of the device in this new billing period.

The billing node, e.g. via the minor may also archive the blockchain, compress the blockchain, delete the blockchain, or remove all use information from the blockchain when it is determined that the billing period is over.

The functional control program of the device may be stored as part of the contract in the blockchain. This avoids that the device can be manipulated by the user. The device 50 can only provide the service by executing the secret program stored on the blockchain. The functional program may only be made available at a given address if the service provider has received the confirmation. The device 50 then downloads the program from the blockchain and then decrypts its source code and verifies that the code originates from the service provider. The device 50 will then execute the program to provide its service, if executing the program has been legally granted via the blockchain.

It is possible to integrate quality of service parameters into the aggregation function for the billing. By way of example, the function to calculate the sum of the last and the new use cases may be replaced by another function taking into account additional parameters such as discounts when the provided quality of service is low.

In a billing scenario, the miner 100 performing operations on the blockchain are typically provided by the billing service provider, but it is also possible that a third party provides a computing resource for the miners. The miners may be considered as IoT devices that provide their computing power to the service provider for billing. If a billing service provider uses a miner to bill one of its contracting parties, the miner creates a new usage transaction for the computing that needs to be paid by the billing service provider.

The above discussed scenarios have the following advantages.

First of all, it makes use of the advantage of a smart contract. With a self-execution of the contract in real time, and with the low execution and compliance costs, it allows an invoicing for the usages of device resources in a secure way, as the user data is anonymous and may be not needed and is not stored in the blockchain. The blockchain cannot be manipulated and the usage of the device may only be possible if the usage records can be stored in the blockchain. In the anonymous billing case the miner does not need to know the ID of the user. Also the billing node does not need to know the user ID, but only makes sure that someone pays the bill.

The integration with the blockchain furthermore provides the guarantee that a user cannot use the device without paying for the usage. Further the information stored in the blockchain can be trusted by relying on the blockchain proof of work. It also offers reconciliation and every transaction is tracked. The scenario is a decentralized system that guarantees high availability and scaling and it is a reliable solution as multiple copies of the blockchain are stored wherein a synchronization between the different entities is carried out. Furthermore, it is a self-organized solution and new device providers can join by placing new resources. After each (billing) period the solution furthermore reduces the necessary amount of data to be kept for the former (billing) period while preserving the data of the former periods. This saves storage and computation time of the participating entities.

The invention claimed is:

1. A method for determining a resource use of resources provided by one or more devices in order to carry out a service, the method being performed by at least one processing circuit at a miner, the method comprising:
   determining a latest block of a blockchain related to the service and a total resource information present in the latest block, wherein the total resource information represents a total amount of the resources used by the one or more devices for providing the service since a defined starting point in time;
   determining that a new use case of resources of a first device of the one or more devices has occurred which is not reflected by the total resource information;
   determining a new amount of the resources used by the first device during the new use case;
   determining a new total resource information in which the total resource information is combined with the new amount of the resources and which reflects a complete use of the resources of the one or more devices from the defined starting point until determining the new total resource information;
   generating a new block of the blockchain;
   adding the new total resource information to the new block;
   adding the new block to the blockchain,
   wherein the blockchain comprises a contract containing at least identification data of the blockchain and usage information indicating which user is entitled to use the resources of the one or more devices; and initiating control of what communication resources of a mobile communications system are operated for use by the first device to provide a service under the contact to the user indicated by the contract and based on the new total resource information.

2. The method according to claim 1, wherein the defined starting point in time represents a beginning of a billing period in which a billing for the use of the resources is started, further comprising:

determining that the billing period should be closed,
determining the new total resource information present in a last block of the blockchain,
closing the blockchain, and
informing a billing node of the new total resource information.

3. The method according to claim 2, further starting a new blockchain when the blockchain is closed and adding new identification data to the new blockchain.

4. The method according to claim 1, wherein a control program needed for executing the service at the device is provided in the current blockchain, further comprising:

receiving a request originating from the one or more devices to use the resources of the device, and
transmitting the control program to the one or more devices.

5. The method according to claim 2, wherein when it is determined that the billing period should be closed, the method further comprising at least one:

archiving the blockchain, compressing the blockchain, deleting the blockchain, removing all use information about a use of the resources from the blockchain while keeping the new total resource information.

6. A miner comprising:
at least one processing circuit; and
a memory comprising instructions executable by the at least one processing circuit to cause the miner to perform operations to:
determine a latest block of a blockchain related to the service and a total resource information present in the latest block, wherein the total resource information represents a total amount of resources used by a one or more devices for providing a service since a defined starting point in time;
determine that a new use case of resources of a first device of the one or more devices has occurred which is not reflected by the total resource information;
determine a new amount of the resources used by the first device during the new use case;
determine a new total resource information in which the total resource information is combined with the new amount of the resources and which reflects a complete use of the resources of the one or more devices from the defined starting point until determining the new total resource information;
generate a new block of the blockchain;
add the new total resource information to the new block;
add the new block to the blockchain,
wherein the blockchain comprises a contract containing at least identification data of the blockchain and usage information indicating which user is entitled to use the resources of the one or more devices; and
initiate control of what communication resources of a mobile communications system are operated for use by the first device to provide a service under the contact to the user indicated by the contract and based on the new total resource information.

7. The miner according to claim 6, wherein the operations determine that the defined starting point in time represents a beginning of a billing period in which a billing for the use of the resources is started, the operations responsively:

determine that the billing period should be closed,
determine the new total resource information present in a last block of the blockchain,
close the blockchain, and
inform a billing node of the new total resource information.

8. The miner according to claim 6, wherein a control program needed for executing the service at the device is provided in the current blockchain, the miner being operative to receive a request originating from the one or more devices to use the resources of the device,
obtain the control program from the current blockchain, and
transmit the control program to the one or more devices.

9. The miner according to claim 6, wherein responsive to when the miner determines that the billing period should be closed, the miner is operative to carry out at least one of:

archiving the blockchain,
compressing the blockchain,
deleting the blockchain,
removing all use information about a use of the resources from the blockchain while keeping the new total resource information.

10. The miner according to claim 6, further being configured to determine an actual new amount of resources used in the new use case after the new use case is terminated,
determine the difference between the actual new amount of resources and a requested amount of resources that is requested for the new use case, wherein, if there is a difference between the actual new amount of resources and the requested amount of resources, the difference between the actual new amount of resources and the requested amount of resources is stored in a correction block and the correction block is added to the blockchain.

11. A computer program product comprising a non-transitory computer readable storage medium storing program code to be executed by at least one processing circuit of a miner or of a billing node wherein execution of the program code causes the at least one processing circuit to:

determine a latest block of a blockchain related to the service and a total resource information present in the latest block, wherein the total resource information represents a total amount of resources used by a one or more devices for providing a service since a defined starting point in time;
determine that a new use case of resources of a first device of the one or more devices has occurred which is not reflected by the total resource information;
determine a new amount of the resources used by the first device during the new use case;
determine a new total resource information in which the total resource information is combined with the new amount of the resources and which reflects a complete use of the resources of the one or more devices from the defined starting point until determining the new total resource information;
generate a new block of the blockchain;

add the new total resource information to the new block;
add the new block to the blockchain,
wherein the blockchain comprises a contract containing at least identification data of the blockchain and usage information indicating which user is entitled to use the resources of the one or more devices; and
initiate control of what communication resources of a mobile communications system are operated for use by the first device to provide a service under the contact to the user indicated by the contract and based on the new total resource information.

12. The method according to claim 1, wherein the initiating control further comprises:
controlling level of utilization of communication resources of the mobile communications system by the first device while providing the service under the contact to the user indicated by the contract, based on the new total resource information.

13. The miner according to claim 6, wherein the operation to initiate control further comprises to:
control level of utilization of communication resources of the mobile communications system by the first device while providing the service under the contact to the user indicated by the contract, based on the new total resource information.

14. The computer program product according to claim 11, wherein the program code executed by the at least one processing circuit to initiate control further comprises to:
control level of utilization of communication resources of the mobile communications system by the first device while providing the service under the contact to the user indicated by the contract, based on the new total resource information.

15. The computer program product according to claim 11, wherein the program code executed by the at least one processing circuit treats the defined starting point in time as representing a beginning of a billing period in which a billing for the use of the resources is started, and wherein execution of the program code responsively further causes the at least one processing circuit to:
determine that the billing period should be closed,
determine the new total resource information present in a last block of the blockchain,
close the blockchain, and
inform a billing node of the new total resource information.

16. The computer program product according to claim 15, wherein execution of the program code further causes the at least one processing circuit to start a new blockchain when the blockchain is closed and add new identification data to the new blockchain.

17. The computer program product according to claim 15, wherein when the at least one processing circuit determines that the billing period should be closed, the processing circuit executing the program code responds by further performing at least one of:
archive the blockchain,
compress the blockchain,
delete the blockchain, and
remove all use information about a use of the resources from the blockchain while keeping the new total resource information.

18. The computer program product according to claim 11, wherein the current blockchain provides a control program to execute the service at the device, and wherein execution of the program code further causes the at least one processing circuit to:
receive a request originating from the one or more devices to use the resources of the device; and
obtain the control program from the current blockchain; and
transmit the control program to the one or more devices.

* * * * *